(12) United States Patent
Bettarello et al.

(10) Patent No.: US 11,781,518 B2
(45) Date of Patent: Oct. 10, 2023

(54) HYDRAULIC TURBINE WITH SELF-POWER GENERATION TO MANAGE, MONITOR AND CONTROL THE PRESSURE AND FLOW IN A WATER OR OTHER FLUID SUPPLY SYSTEM

(71) Applicants: Antonio Carlos Tambellini Bettarello, Franca (BR); Eduardo Jorge Bettarello, Franca (BR); Flávio Jorge Bettarello, Franca (BR)

(72) Inventors: Antonio Carlos Tambellini Bettarello, Franca (BR); Eduardo Jorge Bettarello, Franca (BR); Flávio Jorge Bettarello, Franca (BR)

( * ) Notice: Subject to any disclaimer, the term of this patent is extended or adjusted under 35 U.S.C. 154(b) by 853 days.

(21) Appl. No.: 16/616,894

(22) PCT Filed: Nov. 14, 2018

(86) PCT No.: PCT/BR2018/050420
§ 371 (c)(1),
(2) Date: Nov. 25, 2019

(87) PCT Pub. No.: WO2020/097698
PCT Pub. Date: May 22, 2020

(65) Prior Publication Data
US 2021/0199084 A1    Jul. 1, 2021

(51) Int. Cl.
*F03B 3/12* (2006.01)
*E03B 7/07* (2006.01)
(Continued)

(52) U.S. Cl.
CPC ............... *F03B 3/121* (2013.01); *E03B 7/07* (2013.01); *F03B 15/02* (2013.01); *F15B 5/006* (2013.01);
(Continued)

(58) Field of Classification Search
CPC .... F03B 3/10; F03B 3/103; F03B 3/18; F03B 3/183; F03B 3/186; F03B 11/02;
(Continued)

(56) References Cited

U.S. PATENT DOCUMENTS 3,602,603 A    8/1971   Fukasu et al.
3,682,563 A *  8/1972   Takashima ............ F03B 15/005
                                                                  415/13
(Continued)

FOREIGN PATENT DOCUMENTS

BR    102012010933 A2    12/2013

OTHER PUBLICATIONS

Abstract for BR 102012010933 A2, English translation, 2013, 1 pages.
International Search Report and Written Opinion, PCT/BR2018/050420, dated Jul. 26, 2019, 6 pages.

*Primary Examiner* — Brian O Peters
(74) *Attorney, Agent, or Firm* — Goodhue, Coleman & Owens, P.C.

(57) ABSTRACT

This invention regards a hydraulic turbine (1) to operate in pressure circuits, where there is a flow of a fluid, to control the flow and pressure downstream the installation point. Even so, said turbine (1) can generate power for itself based on the difference of pressure and flow, as the remaining power can be used in public power networks or isolated. Its application field comprises sanitation companies, beverage industries, paper and cellulose industries, petrochemical companies or any places, where it is needed to control the flow and pressure in supply networks.

6 Claims, 11 Drawing Sheets

(51) Int. Cl.
  *F03B 15/02*  (2006.01)
  *F15B 5/00*  (2006.01)
  *F15B 9/00*  (2006.01)
  *E02B 9/06*  (2006.01)
  *F03B 13/10*  (2006.01)

(52) U.S. Cl.
  CPC .................. *F15B 9/00* (2013.01); *E02B 9/06* (2013.01); *F03B 13/10* (2013.01); *F05B 2220/32* (2013.01); *F05B 2220/706* (2013.01)

(58) Field of Classification Search
  CPC ........ F03B 15/005; F03B 15/06; F03B 15/10; F03B 17/062; F03B 17/063; E03B 7/07; E03B 7/075; E03B 7/077; E03B 29/06; F05B 2270/301; F04D 29/448; F04D 29/466; F04D 29/486
  See application file for complete search history.

(56) References Cited

U.S. PATENT DOCUMENTS

| | | | | |
|---|---|---|---|---|
| 4,279,569 | A * | 7/1981 | Harloff | F01D 1/14 |
| | | | | 415/53.3 |
| 7,466,035 | B1 * | 12/2008 | Srybnik | F03B 17/063 |
| | | | | 290/43 |
| 10,451,458 | B2 * | 10/2019 | Artiuch | G01F 1/075 |
| 2007/0020097 | A1 * | 1/2007 | Ursua | F03B 13/264 |
| | | | | 415/213.1 |
| 2008/0088135 | A1 * | 4/2008 | Novo Vidal | H02K 7/1823 |
| | | | | 310/156.12 |
| 2010/0269929 | A1 | 10/2010 | Dodds | |
| 2010/0314880 | A1 | 12/2010 | Cripps | |

\* cited by examiner

HYDRAULIC TURBINE WITH SELF-POWER GENERATION TO MANAGE, MONITOR AND CONTROL THE PRESSURE AND FLOW IN A WATER OR OTHER FLUID SUPPLY SYSTEM

INTRODUCTION

This invention regards a Hydraulic Turbine with Self-power Generation to Manage, Monitor and Control the Pressure and Flow in a Water or Other Fluid Supply System, which was developed to operate in pressure circuits, where there is a flow of fluid, while the downstream flow and pressure from its installation point are controlled. Even so, said turbine can generate its own power, due to the difference in pressure and flow, as the exceeding power in it can be used in public power supply systems or isolated.

APPLICATION FIELD

The application field of this invention concerns sanitation companies, beverage industry, paper and cellulose industry, petrochemicals companies or any places where the control of the flow and the pressure is needed in supply networks.

Problem to Solve

It is known that the control of pressure in water supply networks is fundamental to avoid pipe breakage and minimize losses. Thus, the devices most commonly used to meet such questions are the relief valves and centrifugal pumps that work as turbines. The main disadvantages of relief valves are not using the pressure energy available, dissipating it as heat. Even so, its operation is not stable, as, even under constant pressures, its course continuously varies, generating hydraulic transients in the circuit, which leads to pressure pulses in the pipeline that can generate leakages and even break them. Even so, relief valves present limitations on their work range, as they present cavitation in the small- and medium-sized openings. On the other hand, modern relief valves use electric command, using batteries as an energy source, which generates frequent maintenances and even the interruption of the operation, due to the collapse of the battery. In addition to it, the centrifugal pumps, which work as turbines, use the pressure energy available, but they have no flow control and do not control the pressure in the circuit and the downstream flow of their installation. Another disadvantage of the centrifugal pump working as a turbine is operating most of the time out of its project point, due to variations in the flow, a characteristic posed by its use, with yield considerably below the project one and the reduced flow ranges, even interrupting the power generation.

Purpose of the Invention

The purposes of the invention are the following ones:
Keep the downstream pressure of its installation constant in a duct for any flow and any upstream pressure;
Use power for monitoring, local or remote command and for the control of the pressure and flow in the turbine;
Propose a turbine that does not depend on any external power source;
Propose a turbine that remotely allows changing pressure and flow parameters at any moments;
Propose a turbine that uses the pressure difference as driving force to generate power for itself;
Propose a turbine that generates exceeding energy that can be exported to the local power network or other places.

SUMMARY OF THE INVENTION

This invention regards a Hydraulic Turbine with self-power generation to Manage, Monitor and Control the Pressure and Flow in a Water or Other Fluid Supply Network, which was developed to operate in pressurized circuits and basically comprised by a rotor, even so, made of curved blade assembled around two lateral discs and a fixed shaft over two bearings. The turbine box has a rectangular section with an upstream injector, transporting the fluid to the rotor. The geometrical shape of the turbine box allows more speed for the fluid up to its rotor. The same takes place in suction processes. Even so, the turbine comprises a hydrodynamic profile connected to an electric or hydraulic piston, whose function is controlling downstream pressure of the turbine through flow control. Such electric or hydraulic piston is controlled by a programmable controller, whose reference parameter is given by a pressure transducer, which is installed downstream the turbine.

Thus, the invention aims at controlling the pressure through a flow control in a piping network, working as a common relief valve, that is, reducing the pressure, as well as using the difference in the pressure as a driving force to generate power, which is produced to give it self-sustenance and allowing the exporting of the exceeding power for a local provider, public power networks or isolated.

Advantages of the Invention

This invention presents the following advantages:
It regulates pressure and flow;
Generate power;
It is self-sustainable;
It exports exceeding power;
It presents a great benefit-cost ratio.

DESCRIPTION OF THE DRAWINGS

The invention shall now be described as it is realized. For a better understanding, reference shall be made to the attached drawings, in which they are presented.

TECHNICAL DETAILING DESCRIPTION OF THE INVENTION

The Hydraulic Turbine with self-power generation to Manage, Monitor and Control the Pressure and Flow in a Water or Other Fluid Supply Network regards a turbine (1), which is assembled on a chassis (2) and that, basically, is comprised by the piping box (3) in the upstream area of the turbine (1), which gradually changes the circular section of the tube for the rectangular section of the body of the box (4) of the turbine (1). In order to connect the piping box (3) to the rectangular section of the body of the box (4) a flange (F2) with fixing elements is used, to fix it to the flange (F1) of the body of the box (4) of the turbine (1). In addition, the body of the box (4) of the turbine (1) comprises a geometrical structure that eases the flow of the fluid to the rotor (5), where the body of the box (4) of the turbine (1) presents a superior rectangular opening (6), where, in turn, curves (7A) and (7B) can be seen. The function of curve (7A) is directing the flow to the rotor (5), while the curve (7B) aims at directing the flow downstream of the turbine (1). Even so, below curves (7A) and (7B), there is the preview for curves (7C) and (7D). Curve (7C) directs the flow to the rotor (5) and conforms the injector (23) to the flow on the turbine (1), while curve (7D) is designed to conform to the rotor (5), contributing to the directing of the flow of the fluid upstream the turbine (1). In addition to it, the body of the box (4) presents hollow circular elements (8) in the extreme sides of the body of the box (4) of the turbine (1). The hollow circular elements (8) have holes (9). The rotor (5) is installed on the body of the box (4) of the turbine (1) through conic flanges (11), where mechanical seals (10) confer tightness to the turbine (1) and rigid sphere or conic moving bearings (12) lubricated with grease grant the positioning and alignment to the rotor (5) on the body of the box (4). Finally, there is a cover (13) to shut the set. The conic flanges (11) are fixed on the hollow circular elements (8) through fixing elements transposing the hollows (14) of the conic flanges (11) the holes (09) of the hollow circular elements (8). Thus, the rotor (5) is fixed through extremes of the body of the box (4) of the turbine (1).

Figure 3:
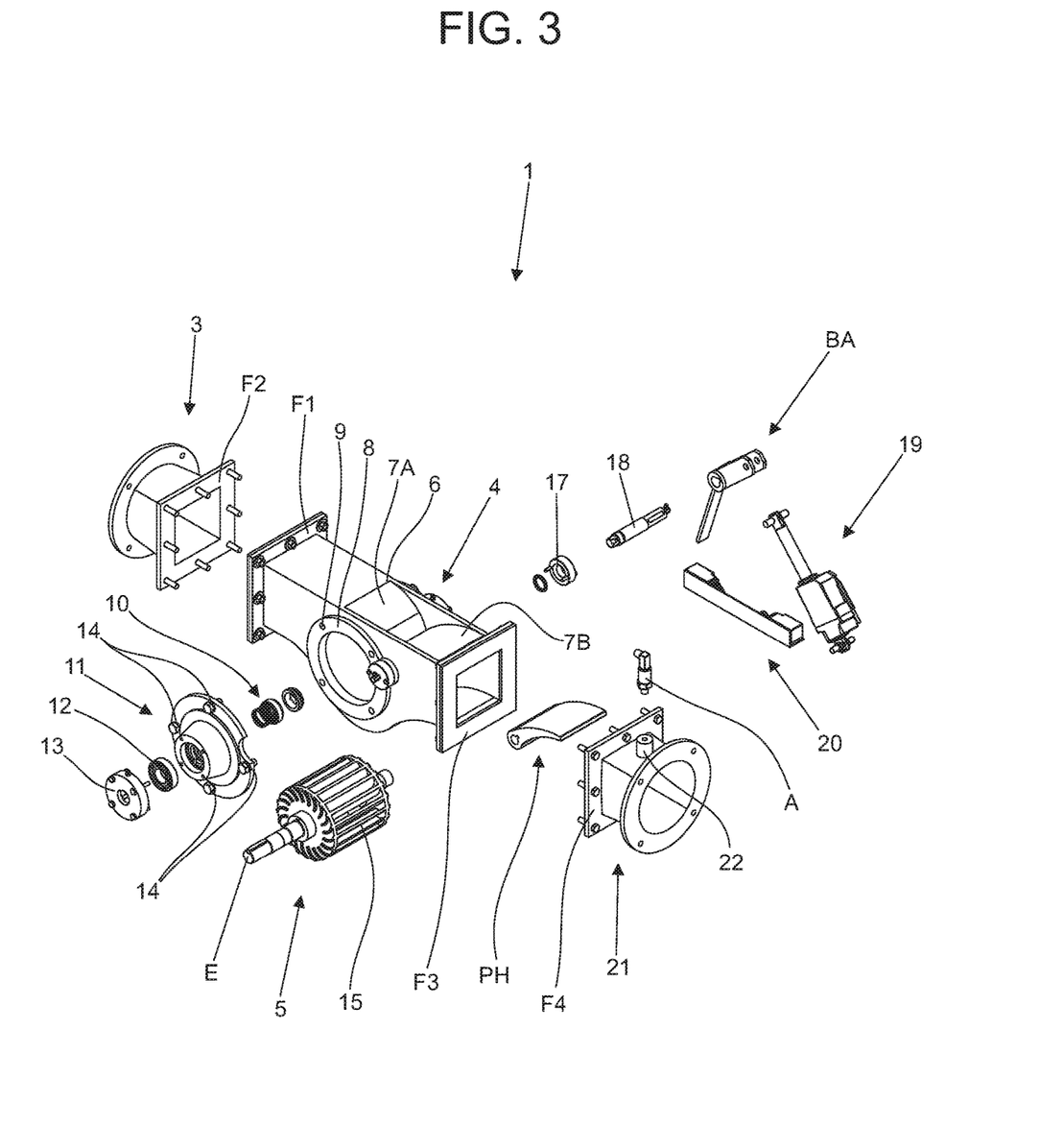
FIG. 3: Exploded-view of the Hydraulic Turbine with self-power generation to Manage, Monitor and Control the Pressure and Flow in a Water or Other Fluid Supply Network.
Figure 4:
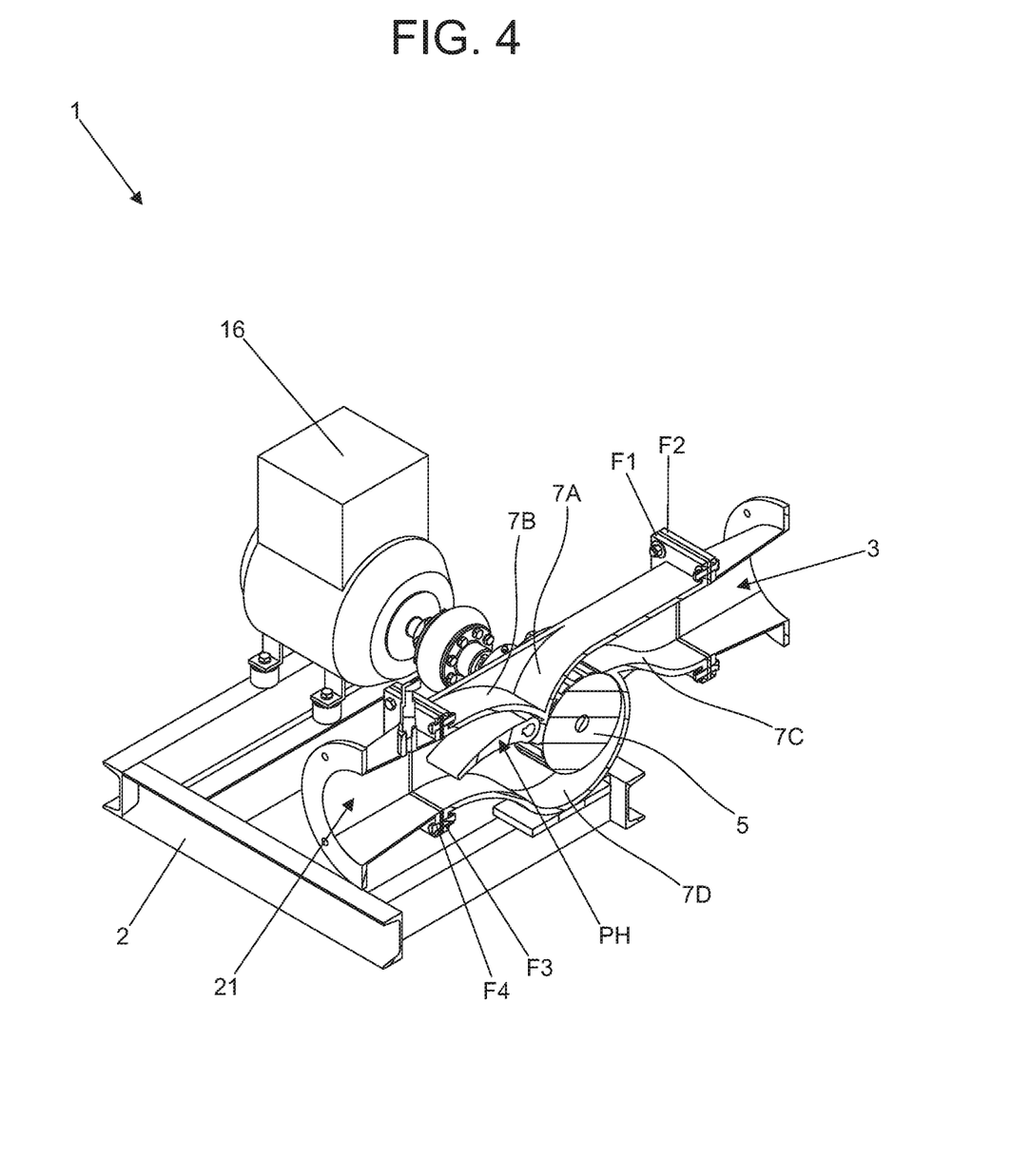
FIG. 4: Perspective section view of the Hydraulic Turbine with self-power generation to Manage, Monitor and Control the Pressure and Flow in a Water or Other Fluid Supply Network.

In addition to it, the rotor (5) of the turbine (1) is comprised by curved blades (15) integrated to two lateral discs, where the angle of attack of the curved blades (15), the curve ray, the length of the bow and the number of the curved blades (15) are defined by the difference in the downstream/upstream pressures imposed to the hydraulic circuit. Then, a shaft (E) trespass the inside of the rotor (5), where two lateral discs are fixed.

Figure 5:
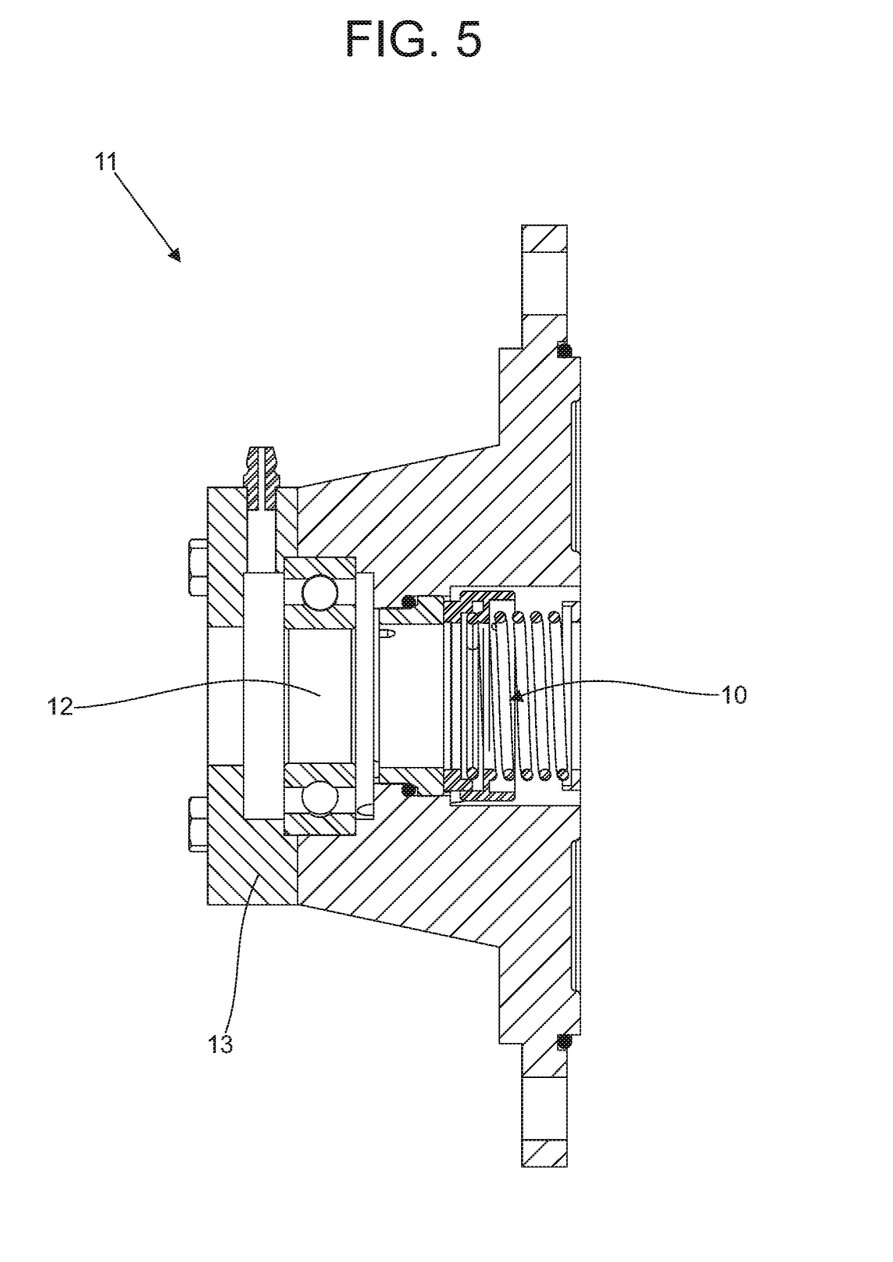
FIG. 5: Section view of the Hydraulic Turbine with self-power generation to Manage, Monitor and Control the Pressure and Flow in a Water or Other Fluid Supply Network, showing the rotor bearing.
Figure 6:
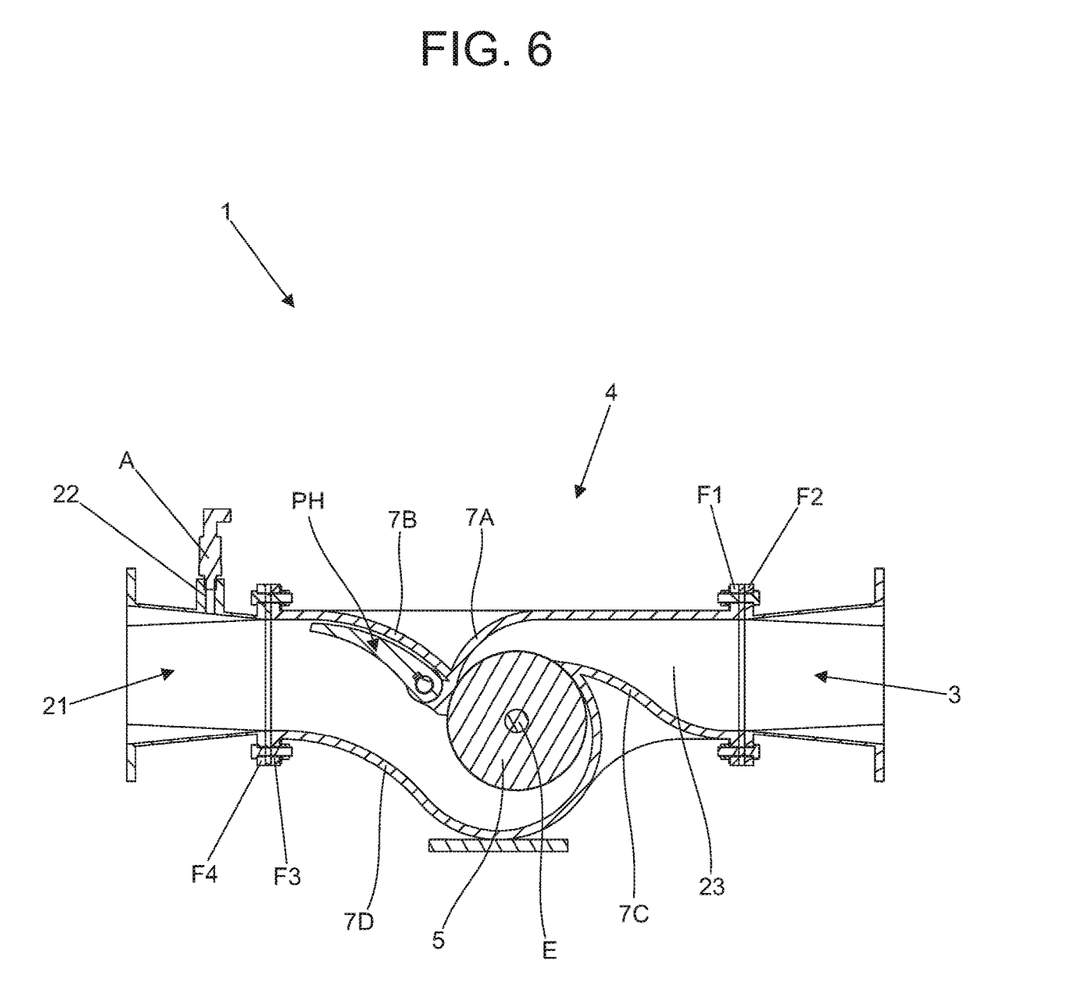
FIG. 6: Section view of the Hydraulic Turbine with self-power generation to Manage, Monitor and Control the Pressure and Flow in a Water or Other Fluid Supply Network, showing the hydrodynamic profile in the first use.
Figure 7:
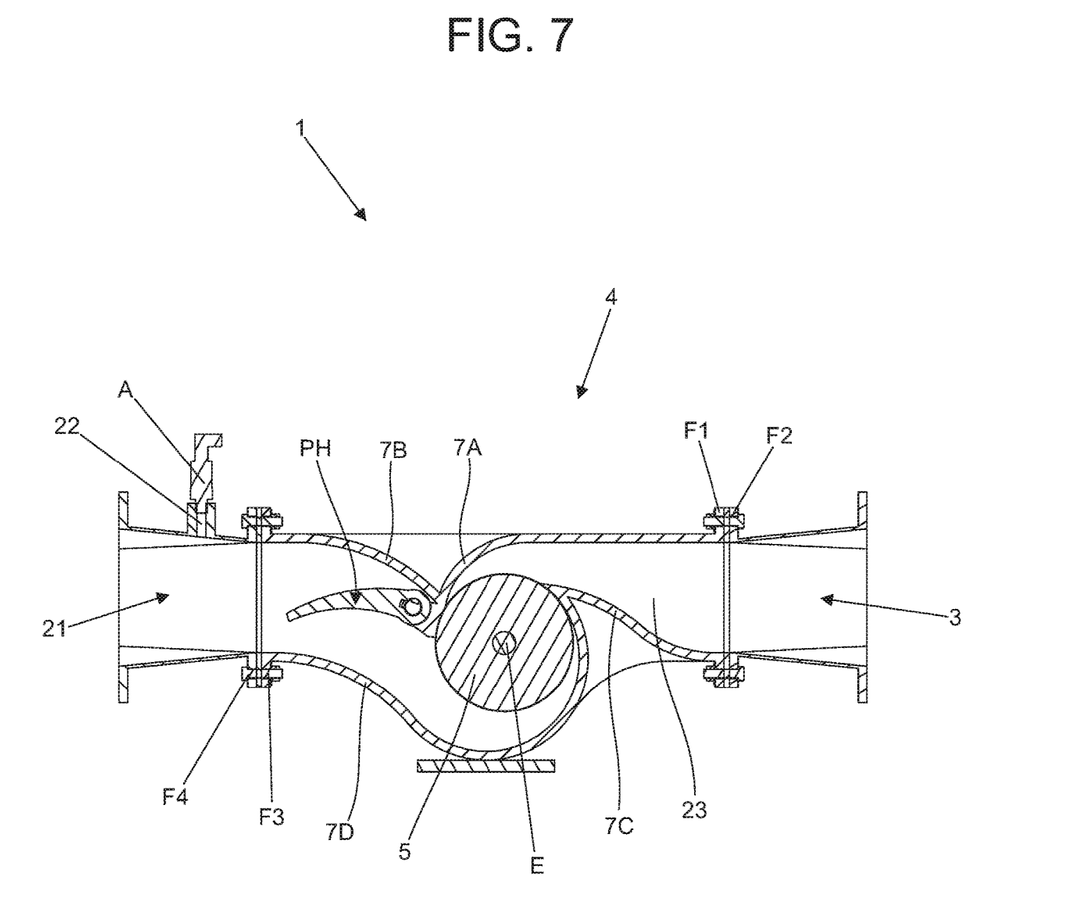
FIG. 7: Section view of the Hydraulic Turbine with self-power generation to Manage, Monitor and Control the Pressure and Flow in a Water or Other Fluid Supply Network, showing the hydrodynamic profile in the second use.
Figure 8:
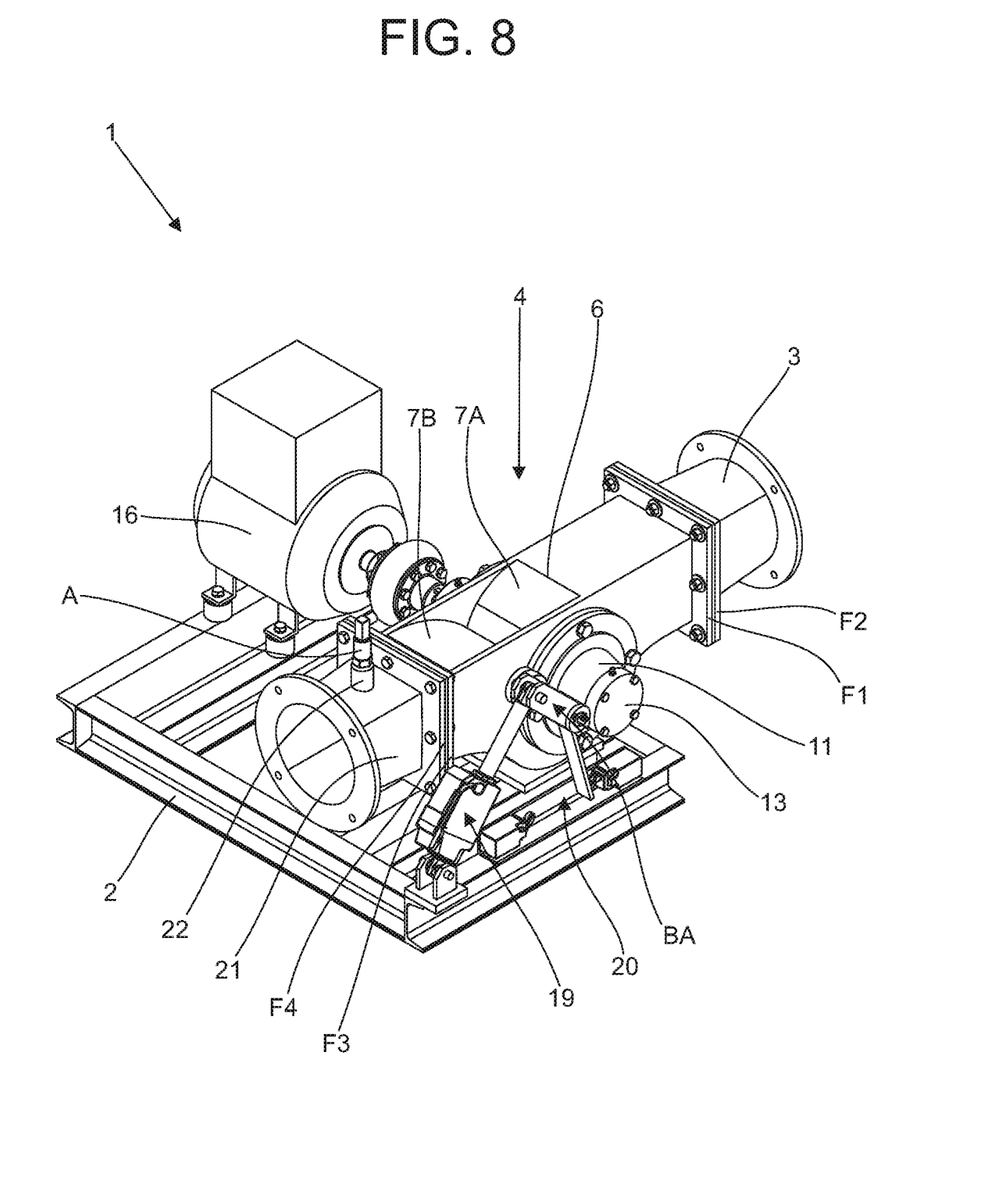
FIG. 8: Perspective view of the Hydraulic Turbine with self-power generation to Manage, Monitor and Control the Pressure and Flow in a Water or Other Fluid Supply Network, showing the hydrodynamic profile in the piston for movement of the hydrodynamic profile in the first use.
Figure 9:
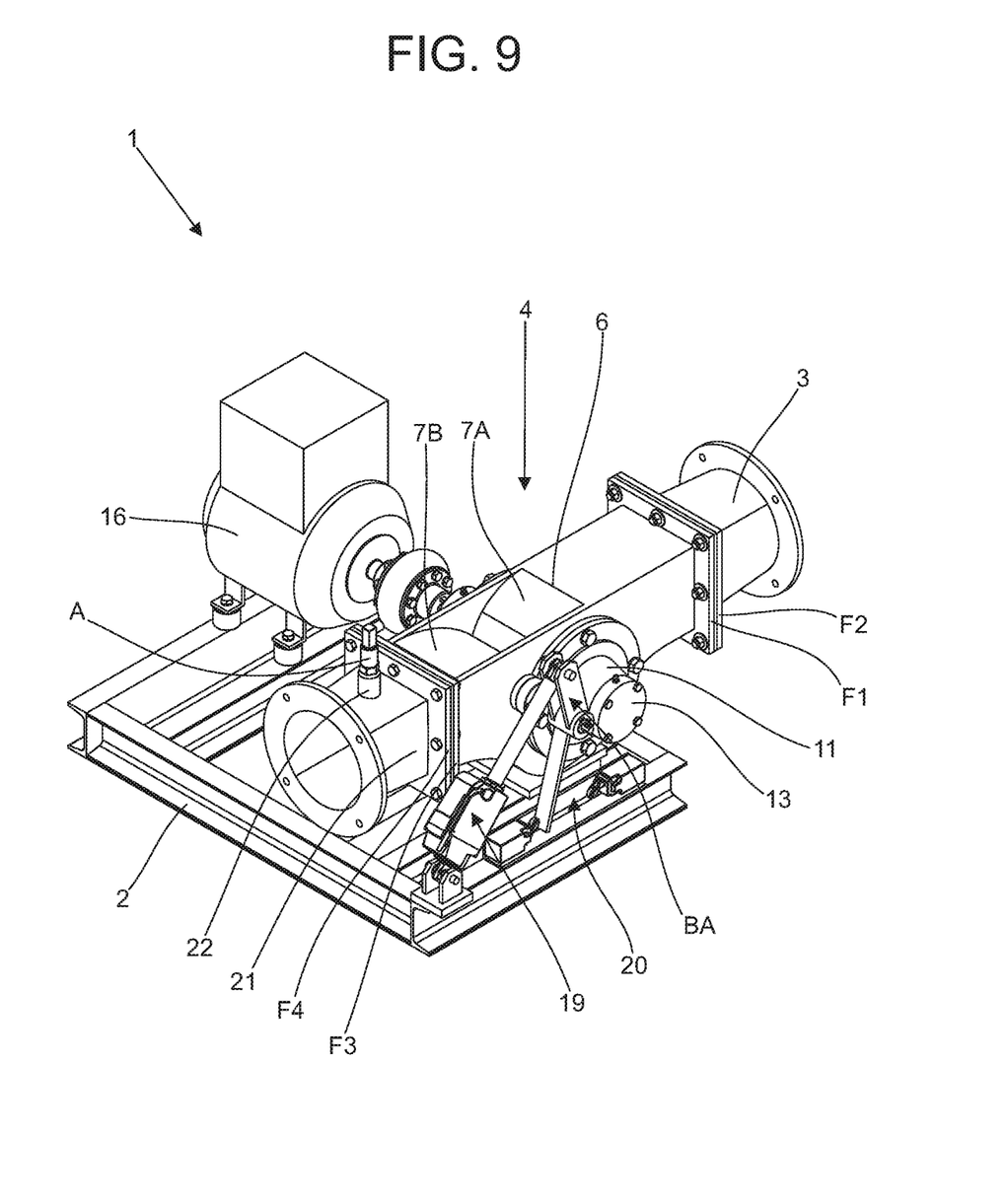
FIG. 9: Perspective view of the Hydraulic Turbine with self-power generation to Manage, Monitor and Control the Pressure and Flow in a Water or Other Fluid Supply Network, showing the hydrodynamic profile in the piston for movement of the hydrodynamic profile in the second use.

The shaft (E) of rotor (5) of the turbine (1) lies on rigid sphere or conic moving bearings (12), where the hydraulic charge, due to the difference in the downstream/upstream pressure and the flow of the turbine (1) generates, in the rotor (5), a mechanical torque, which is transmitted through its shaft (E) to an asynchronous power generator or to an electrical alternator (16), producing power based on the difference of pressure and flow to the turbine (1). The exceeding power in it can be used in public power networks or isolated.

Moreover, a hydrodynamic profile (PH) is installed immediately downstream of the rotor (5), where it receives a connection element (17), a shaft (18) connected to an articulator arm (BA). As a consequence, the articulator arm (BA) is connected to a hydraulic or electrical piston (19), where its moving amplitude is limited by ends of electric courses (20).

Figure 1:
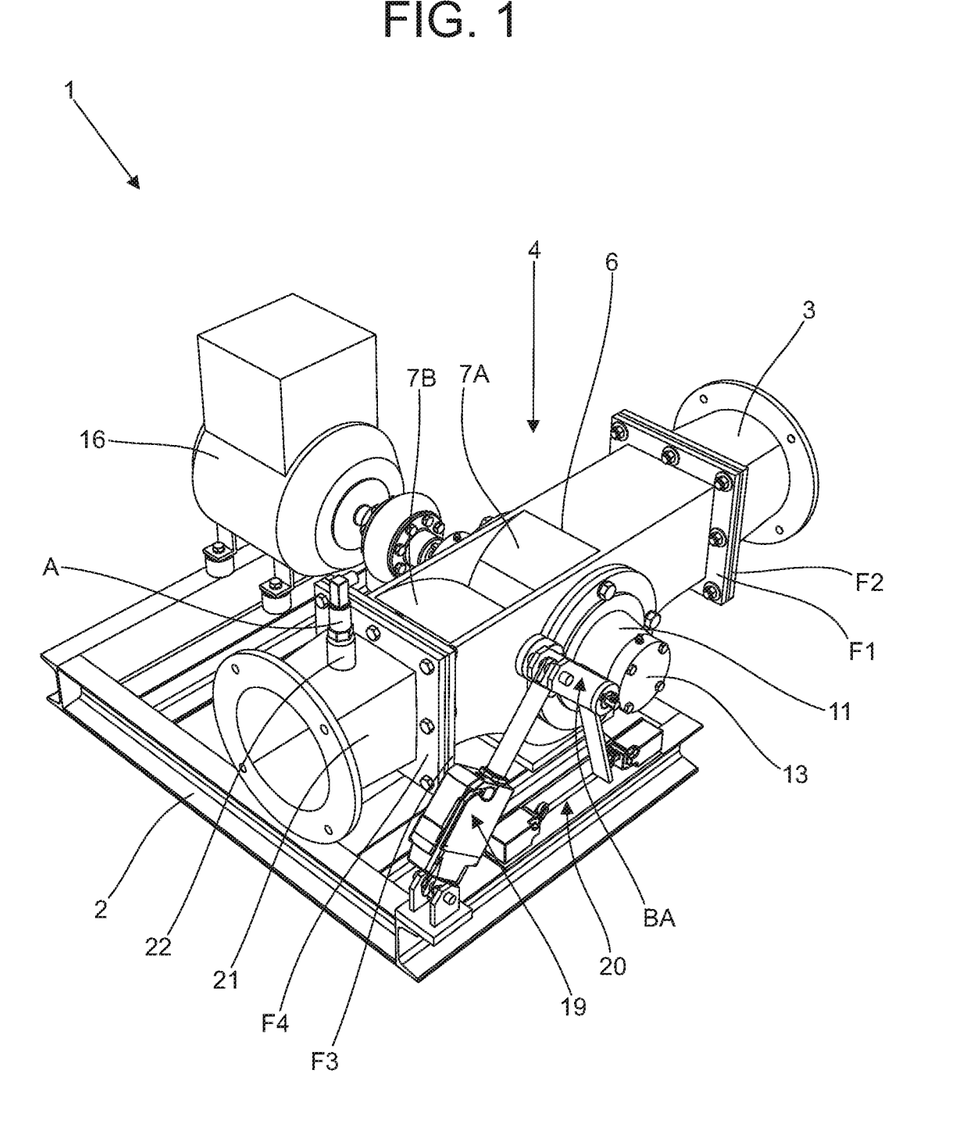
FIG. 1: Perspective view of the Hydraulic Turbine with self-power generation to Manage, Monitor and Control the Pressure and Flow in a Water or Other Fluid Supply Network.
Figure 2:
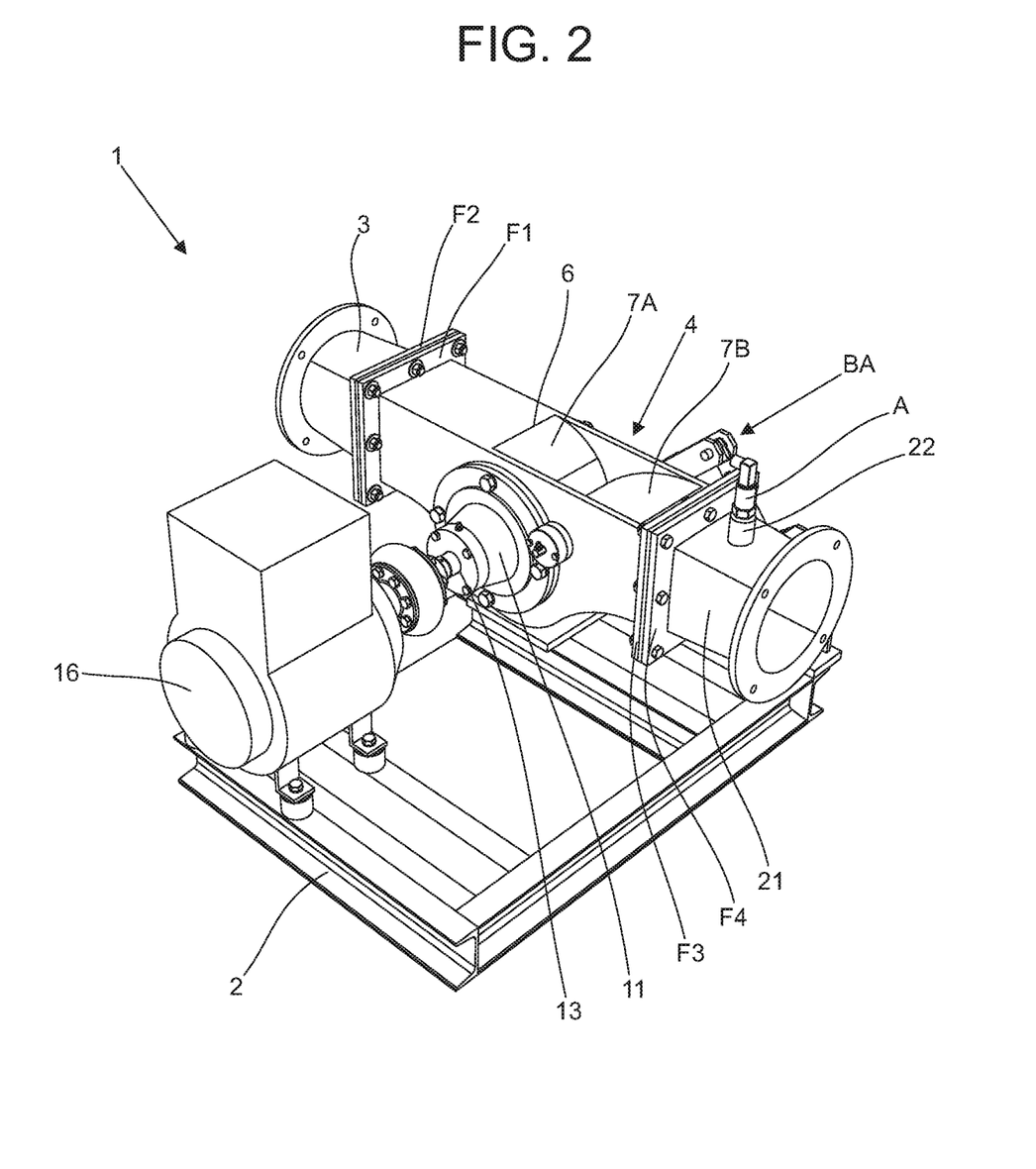
FIG. 2: Inverted perspective view of the Hydraulic Turbine with self-power generation to Manage, Monitor and Control the Pressure and Flow in a Water or Other Fluid Supply Network.

The body of the box (4) of the turbine (1) also comprises an output box (21), which gradually changes the rectangular section of the body of the box (4) of the turbine (1), for the circular section of the tube located downstream it. In order to connect the body of the box (21) to the rectangular section of the body of the box (4), we use its flange (F4) to fix it to the flange (F3) of the body of the box (4) of the turbine (1). The output box (21) also provides for a cylindrical sphere element (22), whose function of receiving a pressure transducer (A).

Working: the fluid enters the piping box (3), which gradually alters the circular section of the tube for the rectangular section of the box (4) of the turbine (1). The fluid enters through an injector (23) located inside the body of the box (4), which is designed to provide the gradual increase of the speed, since the inlet of the piping box (4) of the turbine (1) to the inlet of the rotor (5), where curves (7A) and (7C) provided inside the body of the box (4) direct the flow to the rotor (5). They are compatible to the angle of attack of the curved blades (15) of the rotor (5). Then, the hydrodynamic profile (PH) controls the pressure in the hydraulic circuit downstream the turbine (1) through the control of the flow of the fluid, moving the hydraulic or electric piston (19). More precisely, a universal controller (B) controls the steps in the turbine (1), where the pressure transducer (A) installed in the cylindrical waiting element (22) downstream the turbine (1) monitors the pressure of the circuit and transmits it as the current proportional to the average value measured regarding said universal controller (B). After receiving the current signal transmitted by said pressure transducer (A) it makes a comparison with the standard previously established in the system. After this step, the electric contactor (D) is activated and powers the hydraulic or electrical piston (19), which is connected to the hydrodynamic profile (PH). Thus, the hydrodynamic profile (PH) is articulated through its shaft (E), connected to the articulator arm (BA), as the clockwise (opening) or anticlockwise (closing) movement of the hydrodynamic profile (PH) controls the flow of the fluid in the turbine (1).

Figure 10:
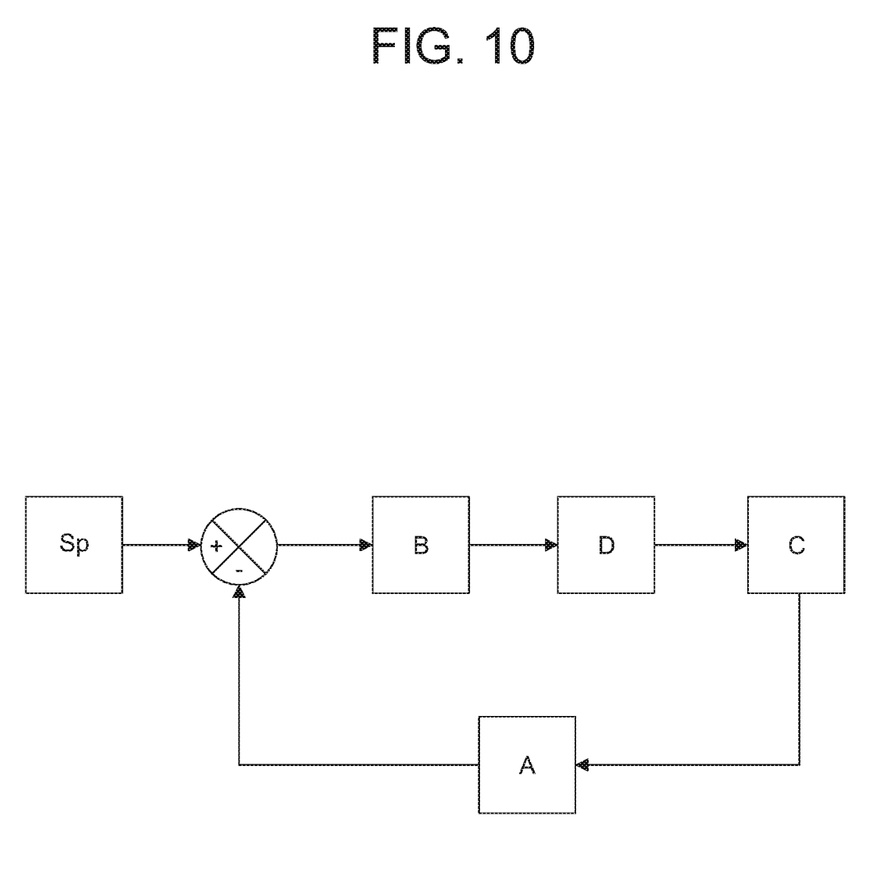
FIG. 10: Diagram of the blocks of the electrical circuit of the Hydraulic Turbine with self-power generation to Manage, Monitor and Control the Pressure and Flow in a Water or Other Fluid Supply Network.
Figure 11:
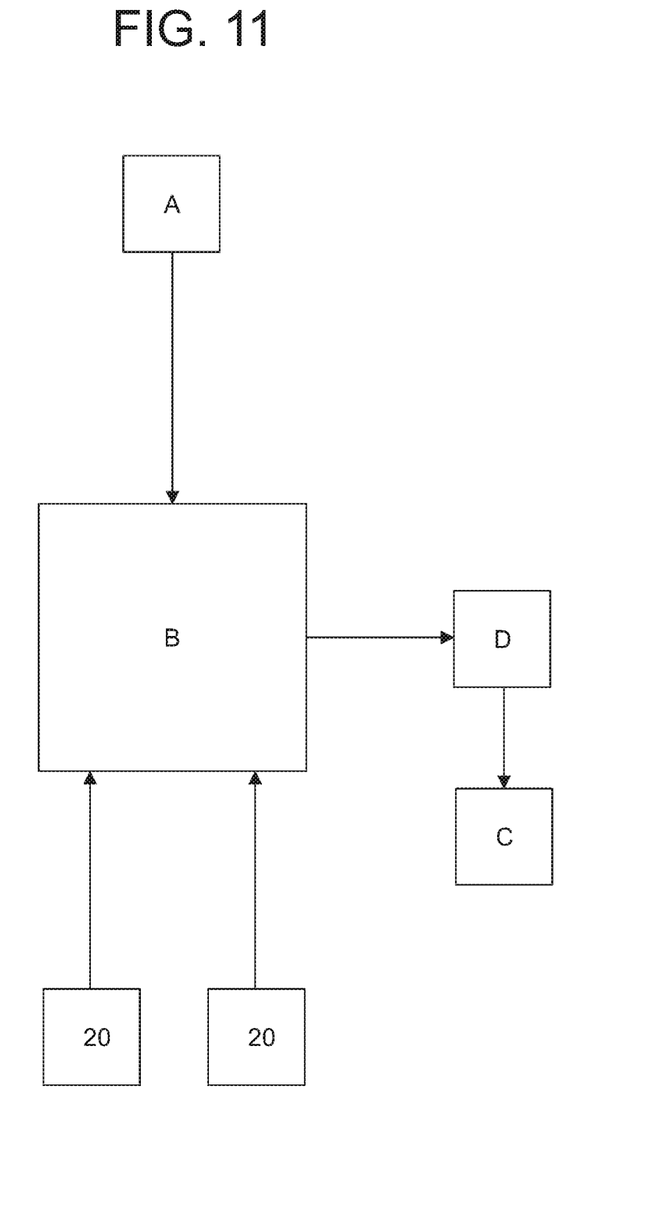
FIG. 11: Diagram of the control blocks of the electrical circuit of the Hydraulic Turbine with self-power generation to Manage, Monitor and Control the Pressure and Flow in a Water or Other Fluid Supply Network.

Thus, as the pressure variation is increased or reduced downstream the turbine (1), the pressure transducer (A) informs the universal controller (B) on the new pressure, and it compares it with the programed nominal pressure that, as said before, opens or closes the hydraulic or electrical piston (19) and, thus, opens or closes the hydrodynamic profile (PH), what can reestablish the nominal pressure. We should highlight the hydraulic or electrical piston (19) has electrical course purposes (20), which limit the amplitude of the movement of the hydrodynamic profile (PH) from totally closed to totally open.

The hydraulic charge, due to the difference between the downstream/upstream pressure and the flow in the turbine (1), generates, in the rotor (5), a mechanical torque, which is transmitted through its shaft (E) to an asynchronous power generator or to an electrical alternator (16), while the rotor (5) uses the difference between the pressure and flow in the turbine (1), converting it into a driving force to generate power, which makes it self-sustaining, as well as allows exporting the exceeding power to the local provider or to public power networks or isolated.

The invention claimed is:

1. A hydraulic turbine assembly with pressure and flow controls, comprising:
    a piping box with a fluid inlet adapted for connecting to a fluid source having a fluid source pressure, wherein the piping box has a first portion with a rectangular cross section, wherein the rectangular shape increases the speed of fluid towards a rotor;
    an output box with a fluid outlet adapted for connecting to a fluid discharge having a fluid discharge pressure;
    a rotor box housing the rotor for generating energy;
    a first section of the rotor box disposed upstream of the rotor, the first section of the rotor box having a fluid opening at a first end adapted for attachment to a fluid outlet of the piping box and having a second end operatively connected to the rotor opposing the first end and a first curve at a top of the first section opposing a third curve at a bottom of the first section, wherein the first curve and the third curve direct fluid from the piping box to the rotor, wherein a distance between the top portion and bottom portion at the first end is greater than a distance between the top portion and the bottom portion at the second end increasing speed of the fluid before passing through the rotor;
    a second section of the rotor box disposed downstream of the rotor, the second section of the rotor box having a fluid opening at a first end of the section adapted for attachment to a fluid inlet of the output box and having a second end opposing the first end, the second end operatively connected to the rotor and a second curve at a top of the second section opposing a fourth curve at a bottom of the second section, wherein the second curve and the fourth curve direct fluid from the rotor to the outlet box, wherein a distance between the top portion and bottom portion at the first end is greater than a distance between the top portion and the bottom portion at the second end decreasing speed of the fluid after passing through the rotor; and
    a hydrodynamic member disposed within the second section of the rotor box downstream of the rotor and having a wing shaped cross section, the hydrodynamic member connected to a shaft extending outside the rotor box;
    wherein movement of the shaft controls movement of the hydrodynamic member between open and closed positions for controlling the pressure and flow of fluid within the hydraulic turbine assembly.

2. The hydraulic turbine assembly of claim 1, wherein the fluid inlet of the piping box has a cylindrical cross section and the fluid outlet of the piping box has a rectangular cross section.

3. The hydraulic turbine assembly of claim 1, wherein the fluid inlet of the output box has a rectangular cross section and the fluid outlet of the output box has a cylindrical cross section.

4. The hydraulic turbine assembly of claim 1, wherein a difference in pressure between the first section and the second section and a flow of fluid generate power.

5. The hydraulic turbine assembly of claim 1, wherein the rotor comprises curved blades integrated into two lateral discs, and wherein the curved blades are compatible with the first curve and the third curve of the first section.

6. The hydraulic turbine assembly of claim 1, further comprising a pressure transducer in the piping box for measuring pressure downstream of the rotor for informing movement of the hydrodynamic member to reestablish a nominal pressure within the hydraulic turbine assembly.

\* \* \* \* \*